Jan. 28, 1941.   J. C. HORNUNG   2,230,058
BIRD FEEDER
Filed March 30, 1939
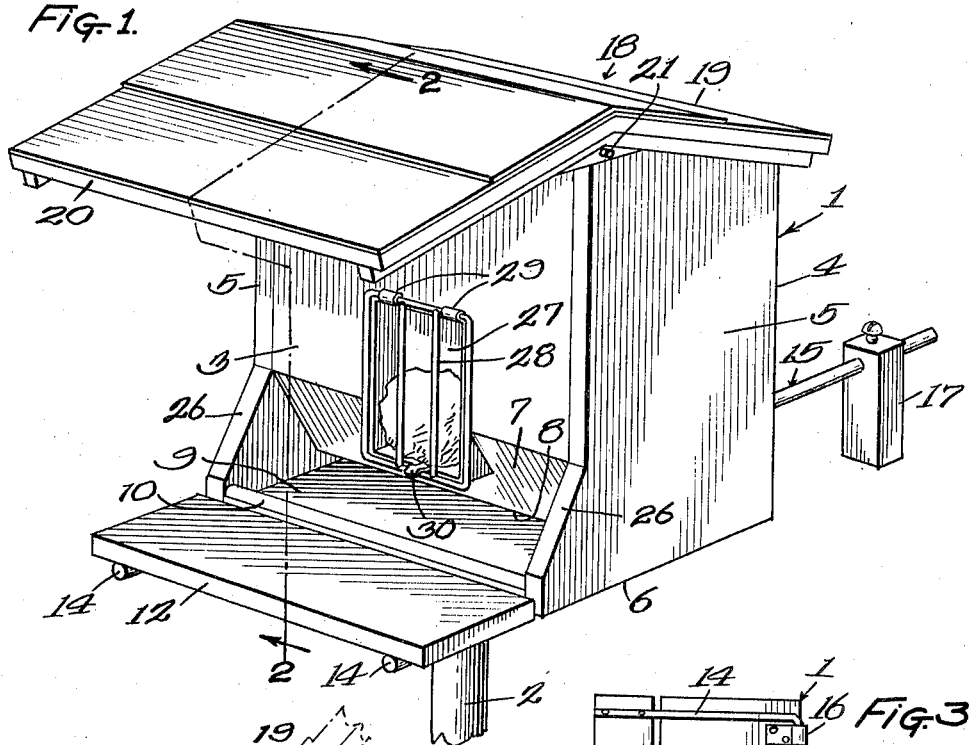
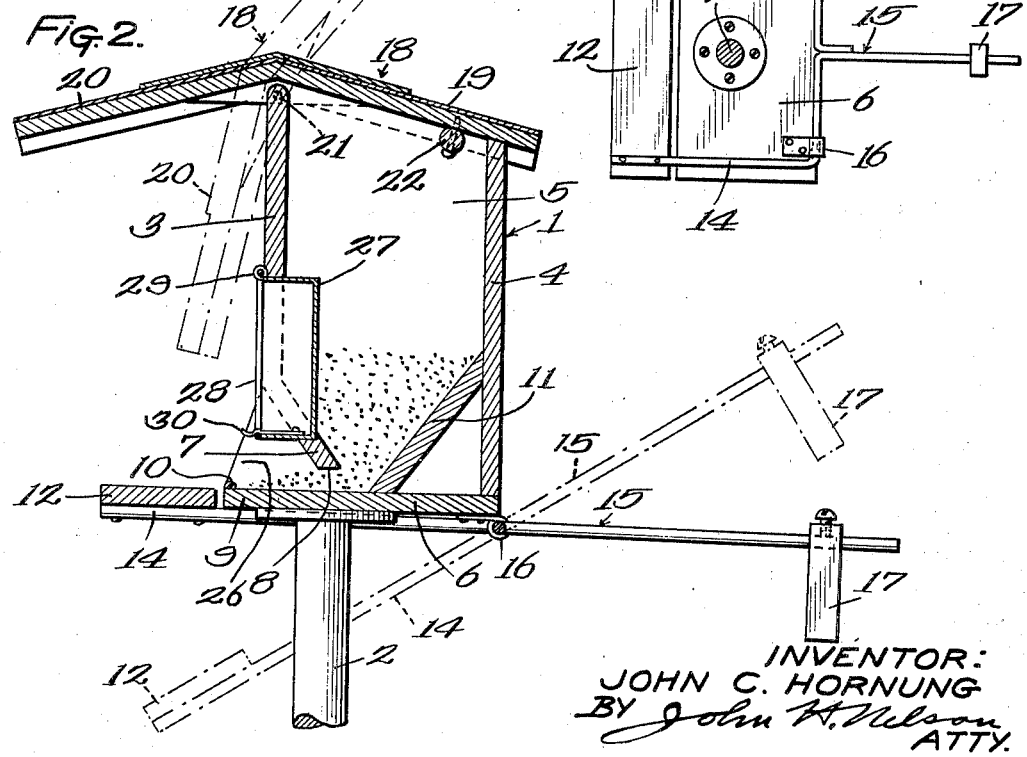
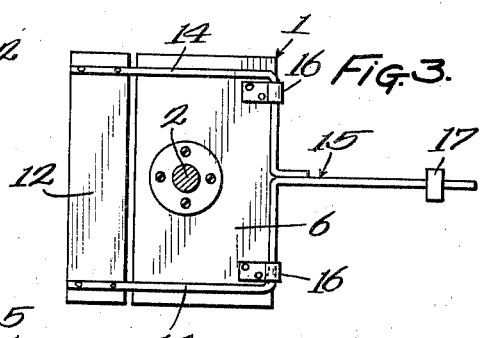
INVENTOR:
JOHN C. HORNUNG
BY John H. Nelson
ATTY.

Patented Jan. 28, 1941

2,230,058

UNITED STATES PATENT OFFICE 2,230,058

BIRD FEEDER

John C. Hornung, Glencoe, Ill.

Application March 30, 1939, Serial No. 264,998

3 Claims. (Cl. 119—52)

This invention relates to bird feeders, and has for its main object to provide such a feeder that will only be accessible to birds under a given weight or size.

The invention more particularly aims to provide such a feeder wherein the food dispensed thereby will be maintained in a clean condition and yet be plainly visible to the birds, and wherein there is means arranged to support birds under a given weight in feeding relation to the food, with said means being operable under the weight of birds over said given weight to eject same from the feeder, and that will likewise eject such rodents as squirrels if they attempt to approach the feeder.

Although the invention is mainly concerned with the feeding of birds, its use is not to be so limited as it can be easily adapted for feeding small animals in the same manner as well without departing from the spirit of the invention.

Other objects and advantages will become apparent by reference to the specification and the accompanying drawing, in which:

Fig. 1 is a view in perspective of the feeder embodying one form of the invention.

Fig. 2 is a vertical section of the feeder, as taken substantially on the section line 2—2 of Fig. 1.

Fig. 3 is a bottom plan view of the feeder.

The feeder, as illustrated, includes a food container 1 which may be mounted upon a suitable upright or post 2 at a desirable elevation above the ground. The container is in the form of a hopper adapted to contain a supply of grain suitable for small birds, and is made up of a front-wall 3, a back-wall 4, side-walls 5 and a bottom-wall 6.

The front-wall 3 of the hopper has a lower portion 7 slanting inwardly of the hopper and terminating at its bottom edge above the bottom wall 6 to form an elongated discharge outlet 8 for the grain in the hopper. The bottom-wall of the hopper has a portion 9 extending beyond the outlet to form a shelf upon which the grain is fed from the outlet, with the shelf having a guard rail 10 extending along its outer edge to maintain the grain thereon. To maintain a given amount of grain on the shelf as it is consumed, the rear-wall 4 has a lower portion 11 slanting toward the outlet so as to direct the grain theretoward.

In accordance with the objects of the invention, supporting means is provided for supporting birds under a given weight in feeding relation to the shelf, and that will operate under the weight of birds that are over said given weight to eject same from the feeder. To this end, the supporting means comprises a perch or platform 12 normally arranged adjacent the outer edge of the shelf 9. The platform is mounted upon the outer ends of laterally spaced portions 14 of a lever 15 which is disposed horizontally under the hopper and hinged at its central portion thereto, as at 16, with said spaced portions 14 of the lever being arranged to engage the bottom of the hopper for limiting their upward movement when the platform is adjacent the shelf 9. Mounted on the other end of the lever 15 for adjustment therealong, is a counterpoise or counterweight 17 to counterbalance the platform so that same will be yieldably held in its raised position adjacent the shelf 9, with said counterweight being also capable of counterbalancing a bird under a given weight supported on the platform, and whereby the platform will be lowered to a tilted position under a load thereon that is over said given weight. Therefore, in the event a large bird, rodent or squirrel attempts to approach the shelf 9 by way of the platform, it will be ejected therefrom as the platform is moved or lowered to a tilted position, as illustrated in Fig. 2.

The invention also contemplates balking the efforts of rodents or squirrels to approach the shelf 9 by way of the top of the hopper. To accomplish this, the hopper is provided with a gable-like roof or cover 18 having a sloping side 19 extending over the hopper from the top of its front-wall and having its other sloping side 20 extending over the shelf 9 and the platform 12. The roof 18 is pivoted at its ridge portion to the hopper, as at 21, whereby the side portion 20 of the roof may tilt downward, as illustrated in Fig. 2. A counterpoise or counterweight 22 is mounted on the under-side of the portion 19 of the roof to counterbalance the roof portion 20 to maintain the roof in closed position on the hopper but permitting the roof portion 20 to tilt under the weight of a rodent or squirrel passing thereover in its attempt to approach the shelf 9, and whereupon the rodent or squirrel will be caused to slide off said roof portion and be ejected from the feeder.

The roof portion 20 also serves to prevent the accumulation of snow or ice on the platform 12 during the winter seasons, so that the platform will not be lowered or rendered inoperative under the added weight of snow or ice thereon.

The lower front-edge portions 26 of the side-walls 5 of the hopper slope forwardly toward the front-edge of the shelf 9 to form a recess with the shelf and the inwardly slanting front-wall portion 7 of the hopper, with the outlet 8 providing the open bottom of the recess opening into the hopper. The slanting wall portion 7 is so arranged that a large bird or rodent will not be capable of supporting itself in the recess to partake of the grain on the shelf.

By virtue of the structure described, a feeder has been provided that will only be accessible to birds of a predetermined size or weight; that will be serviceable practically during all kinds of weather; and by virtue of the adjustability of the counterweight 17 on the lever 15, the counterbalancing effect thereof upon the platform 12 may be regulated to render the feeder accessible to birds of various sizes or weight.

As suet is a favorite food of some birds, a small box-like container 27 is provided in the outer face of the front-wall 3 of the hopper and arranged so as to be within range of a bird supported on the platform 12, and within which container this type of food may be placed for the birds. The container 27, as illustrated, may have an open front-side provided with a cover in the form of grating 28 for retaining the suet in the container while permitting access thereto. The cover 28 may be hinged to the container 27, as at 29, and may be held in closed position by a resilient detent 30 in the form of a leaf-spring attached to the container and having a hooked end for hooking engagement with the grating.

Having thus described my invention, I claim:

1. A bird feeder comprising a food dispensing hopper having a front wall terminating above the bottom of the hopper to form a food outlet, the hopper having a bottom portion extending beyond the outlet to provide a shelf to receive food from the outlet, a movable perch normally arranged alongside the shelf to support a bird in feeding relation to the shelf, means mounting the perch for movement to a lowered position away from the shelf so that a bird on the perch will be out of feeding relation to the shelf, and counterbalancing means cooperating with said mounting means for yieldingly maintaining the perch in its normal position alongside the shelf with a bird on the perch under a given weight and arranged to cause the perch to be moved to its lowered position by force of a bird thereon heavier than said given weight.

2. A bird feeder comprising a food dispensing hopper having a front wall including an upright upper portion continuing into an inwardly slanting lower wall portion terminating above the bottom of the hopper to form a food outlet, the hopper having a bottom portion extending beyond the outlet to provide a shelf adapted to receive food from the outlet and arranged to form with said inwardly slanting lower wall portion a recess opening forwardly of the hopper so that the food on the shelf will be plainly visible from the front thereof and adapted to prevent birds from standing on the shelf, a movable perch normally arranged alongside the shelf to support a bird in feeding relation to the shelf, means mounting the perch for movement to a lowered position away from the shelf so that a bird on the perch will be out of feeding relation to the shelf, and counterbalancing means cooperating with said mounting means for constantly yieldingly urging the perch into its normal position alongside the shelf with a bird on the perch under a given weight and arranged to cause the perch to be moved to its lowered position by force of a bird thereon heavier than said given weight and whereby the perch will be raised into its normal position by said counterbalancing means upon removal of the bird therefrom.

3. The structure as defined in claim 2, wherein the mounting means includes a normally horizontal lever extending under the hopper and upon one end of which the perch is mounted with the lever being hinged at its central portion to the bottom of the hopper adjacent its rear edge to permit the other end of the lever to swing upward when the perch is lowered, and wherein the counterbalancing means includes a counterweight mounted on the said other end of the lever for adjustment therealong.

JOHN C. HORNUNG.